US008145942B2

(12) United States Patent
Nguyen

(10) Patent No.: US 8,145,942 B2
(45) Date of Patent: Mar. 27, 2012

(54) METHODS AND SYSTEMS FOR TROUBLESHOOTING REMOTE SYSTEMS THROUGH RECREATION OF REMOTE SYSTEM SCENARIOS

(75) Inventor: Trinh H. Nguyen, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 2 days.

(21) Appl. No.: 12/749,264

(22) Filed: Mar. 29, 2010

(65) Prior Publication Data

US 2011/0239052 A1    Sep. 29, 2011

(51) Int. Cl.
*G06F 11/00* (2006.01)

(52) U.S. Cl. ..................... 714/6.31; 714/38.14
(58) Field of Classification Search ............ None
See application file for complete search history.

(56) References Cited

U.S. PATENT DOCUMENTS

| | | | | |
|---|---|---|---|---|
| 5,644,696 | A | 7/1997 | Pearson et al. | 395/182.04 |
| 6,298,457 | B1 * | 10/2001 | Rachlin et al. | 714/49 |
| 7,266,719 | B1 * | 9/2007 | LeCrone et al. | 714/5.11 |
| 7,467,282 | B2 | 12/2008 | Rao et al. | 711/202 |
| 7,634,760 | B1 * | 12/2009 | Gumtow et al. | 717/125 |
| 2002/0087950 | A1 * | 7/2002 | Brodeur et al. | 717/124 |
| 2004/0123271 | A1 * | 6/2004 | Bindewald et al. | 717/124 |
| 2005/0210077 | A1 * | 9/2005 | Balakrishnan et al. | 707/200 |
| 2007/0078901 | A1 * | 4/2007 | Satou et al. | 707/200 |

FOREIGN PATENT DOCUMENTS

| | | |
|---|---|---|
| JP | 58107976 A | 6/1983 |
| JP | 11-003259 | 1/1999 |
| JP | 2001-175426 | 6/2001 |

* cited by examiner

*Primary Examiner* — Christopher McCarthy
(74) *Attorney, Agent, or Firm* — Zilka-Kotab, PC

(57) ABSTRACT

According to one embodiment, a debugging tool includes a processor and logic, that when executed by the processor, causes the processor to: receive a Volume Table of Contents (VTOC)/INDEX data set for a first VTOC/INDEX data of a remote system, create second VTOC/INDEX data (which is a replicated version of the first VTOC/INDEX data of the remote system) from the VTOC/INDEX data set, execute a second scenario (which is a replicated version of a first scenario that was executed on the remote system using the first VTOC/INDEX data that caused the error) using the second VTOC/INDEX data to reproduce an error, and set up trace points in the second VTOC/INDEX data to start a debugging session while executing the second scenario using the second VTOC/INDEX data. Other systems, methods, and computer program products are also described according to various other embodiments.

19 Claims, 3 Drawing Sheets

METHODS AND SYSTEMS FOR TROUBLESHOOTING REMOTE SYSTEMS THROUGH RECREATION OF REMOTE SYSTEM SCENARIOS

BACKGROUND

For most Direct Access Storage Devices (DASDs) attached to Multiple Virtual Storage (MVS) systems, data on a volume is described by a Volume Table of Contents (VTOC), and, possibly, by an additional INDEX data set for quicker access to the VTOC data, called data sets. In other words, the VTOC and INDEX data sets show the extents of the volume that are available as free space as well as any extents that currently store data. The VTOC describes the free-space and used-space extents and their locations with different types of Data Set Control Blocks (DSCBs). The INDEX data set is an extension of the VTOC that provides faster access to the data sets and maps out volume free space extents when the VTOC index data set is available.

However, most of the MVS systems are not debugged onsite, as this requires a person with expert knowledge of the system to travel to the remote site in order to examine the error scenario. Therefore, most remote systems are debugged remotely. Currently, if a software error results in corruption of the VTOC or INDEX, problem analysis typically requires an Extended Binary Coded Decimal Interchange Code (EBCDIC) printout of the entire VTOC and INDEX. Often, traces and dumps of the software code that processes the VTOC and INDEX are also requested and obtained. The problem analysis requires a recreation of the error scenario in order to identify the code logic that is in error. Sometimes, it is possible to recreate the error on a smaller-scale, with less data sets than are on the volume; but, again, this requires traces and dumps from the remote system. In other cases, the EBCDIC printout of the VTOC and INDEX are examined and then the information is manually transferred to create a new VTOC and INDEX in the volume for further in-house analysis.

Remote system volumes may contain tens of thousands of data sets or more. Additionally, volume sizes in the future may increase the number of data sets on a volume by several orders of magnitude. As the volume size increases, so does the size of the VTOC and INDEX. Depending on the volume size, and the fragmentation of the data set extents, current debugging processes can become extremely complex and have a number of drawbacks. A first drawback is that debugging of a remote system is a time-consuming, iterative process that requires requests for traces and dumps from the remote system. Another drawback to current debugging techniques is the recreation of the error, which requires visual examination of the EBCDIC printout of the VTOC/INDEX. Another drawback of current techniques is that the processes used may become even more unmanageable if information from the EBCDIC printout needs to be manually transferred to recreate the remote system VTOC/INDEX configuration.

Therefore, a system and method which can recreate remote system error scenarios without requiring visual examination of the EBCDIC printout of the VTOC/INDEX or requests for traces and dumps from the remote system would be very beneficial to the field of debugging remote systems.

SUMMARY

A computer implemented system for identifying problems in remote system data according to one embodiment includes logic for receiving a data set representative of data of a remote system; logic for replicating the data of the remote system using the data set; logic for writing the replicated data to a simulation volume, the simulation volume having a same configuration as a volume of the remote system having the data; a problem identification module for recreating an error scenario and identifying an error in the replicated data.

In one embodiment, a debugging tool includes a processor and logic, that when executed by the processor, causes the processor to: receive a Volume Table of Contents (VTOC)/INDEX data set for a first VTOC/INDEX data of a remote system; create second VTOC/INDEX data from the VTOC/INDEX data set, the second VTOC/INDEX data being a replicated version of the first VTOC/INDEX data of the remote system; execute a second scenario using the second VTOC/INDEX data to reproduce an error, the second scenario being a replicated version of a first scenario that was executed on the remote system using the first VTOC/INDEX data that caused the error; and set up trace points in the second VTOC/INDEX data to start a debugging session while executing the second scenario using the second VTOC/INDEX data.

In another embodiment, a method includes receiving a VTOC/INDEX Extended Binary Coded Decimal Interchange Code (EBCDIC) or American Standard Code for Information Interchange (ASCII) data set for a first VTOC/INDEX data of a remote system; creating second VTOC/INDEX data from the VTOC/INDEX EBCDIC ASCII data set, the second VTOC/INDEX data being a replicated version of the first VTOC/INDEX data of the remote system; using a processor to execute a second scenario using the second VTOC/INDEX data to reproduce an error, the second scenario being a replicated version of a first scenario that was executed on the remote system using the first VTOC/INDEX data that caused the error; and setting up trace points in the second VTOC/INDEX data to start a debugging session while executing the second scenario using the second VTOC/INDEX data.

According to another embodiment, a computer program product includes a computer readable storage medium having computer readable program code embodied therewith. The computer readable program code includes computer readable program code configured to receive a VTOC/INDEX data set for a first VTOC/INDEX data of a remote system; computer readable program code configured to create second VTOC/INDEX data from the VTOC/INDEX data set, the second VTOC/INDEX data being a replicated version of the first VTOC/INDEX data of the remote system; computer readable program code configured to execute a second scenario using the second VTOC/INDEX data to reproduce an error, the second scenario being a replicated version of a first scenario that was executed on the remote system using the first VTOC/INDEX data that caused the error; and computer readable program code configured to set up trace points in the second VTOC/INDEX data to start a debugging session while executing the second scenario using the second VTOC/INDEX data.

Other aspects and embodiments of the present invention will become apparent from the following detailed description, which, when taken in conjunction with the drawings, illustrate by way of example the principles of the invention.

DETAILED DESCRIPTION

Figure 1:
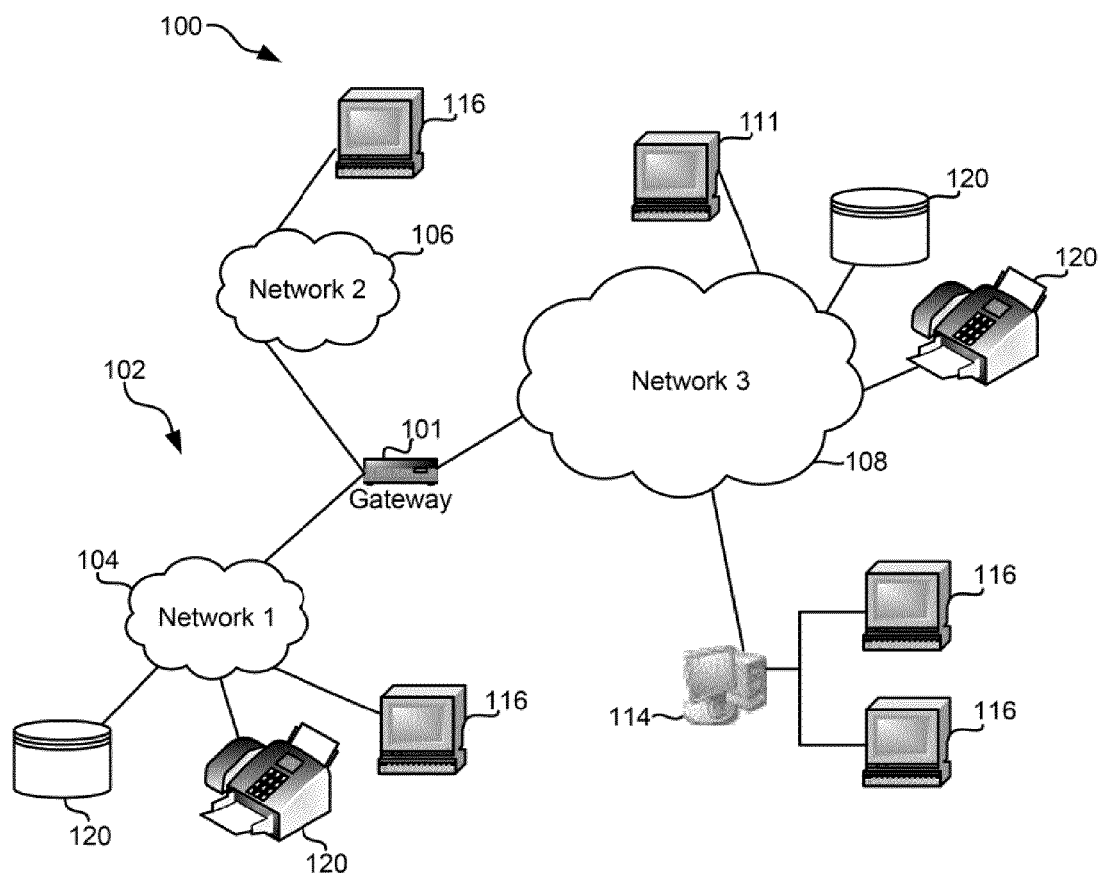
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

According to a general approach, a tool may be used to debug data errors on a remote system. Such errors may include Volume Table of Contents (VTOC)/INDEX-related problems, such as inconsistency between system data and the index. The tool, according to preferred approaches, may automate the analysis process for troubleshooting remote systems by receiving a print or other data set representative of data of the remote system, converting this print or data set to raw data, e.g., raw VTOC/INDEX data, and writing the raw data to a local volume that can be used to simulate the remote system's volume as a local simulation volume to troubleshoot the error(s) encountered when executing tasks on the remote system.

In some embodiments, a tool can be used to debug data errors on a remote system, such as VTOC/INDEX-related problems. To place the present description in a context, and by way of example only, much of the following description will discuss debugging using VTOC/INDEX data. It should be kept in mind that other types of data may be used in the various approaches disclosed herein.

The tool, according to preferred approaches, may automate the analysis process for troubleshooting remote systems. The tool takes a data set, referred to herein as a "print" which may be a scan of a paper print, an electronic data set, an electronic document, a database, table, etc. of the remote system as input, converts this print to raw VTOC/INDEX data, and writes the raw data to a volume that can be used to simulate the remote system's volume as a simulation volume. The raw VTOC/INDEX data on the simulation volume is identical to the remote system's VTOC/INDEX data.

As noted above, troubleshooting problems at remote sites is problematic. The tool disclosed herein has many advantages over currently used methods, including automating the process of duplicating VTOC/INDEX data. Currently used methods manually duplicate VTOC/INDEX data, which is error-prone and can lead to additional time spent trying to isolate problems. Another advantage of some embodiments is that it eliminates the need for actual remote system data, that may be highly sensitive in nature, since all that is used, in some approaches, is the print of the VTOC/INDEX. In some approaches, the VTOC/INDEX print may adhere to one or more formats, including Extended Binary Coded Decimal Interchange Code (EBCDIC), American Standard Code for Information Interchange (ASCII), and the like.

Additional advantages include recreation of the remote system's problem faster than with conventional methods, since current turn-around time, from the initial creation of a problem record to the problem resolution, can often take weeks due to the necessity to gather additional documentation from the remote system. With the tool, repeated dumps and traces from the remote system are not needed. In some approaches, with the tool, a "clone" of the remote system's VTOC/INDEX can be created as soon as the EBCDIC print of the remote system's VTOC/INDEX is received, thereby reducing the time to recreate the failing configuration from days or weeks or longer, to as little as minutes or hours. Additionally, the recreation of a particular remote system error scenario results in a new test case that can be added to existing regression test buckets for further refinement of the analysis process.

As will be appreciated by one skilled in the art, the present invention may be embodied as a system, method, or computer program product. Accordingly, the present invention may take the form of an entirely hardware embodiment, a software embodiment (including firmware, resident software, microcode, etc.) operating an apparatus or an embodiment combining software and hardware aspects that may all generally be referred to herein as a "circuit," "module" or "system." Furthermore, the present invention may take the form of a computer program product stored in any tangible medium of expression having computer-usable program code stored in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 1 illustrates a network architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a WAN such as the Internet, PSTN, internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, laptop computer, hand-held computer, printer or any other type of logic. It should be noted that a user device 111 may also be directly coupled to any of the networks, in one embodiment.

A peripheral 120 or series of peripherals 120, e.g. facsimile machines, printers', networked storage units, etc., may be coupled to one or more of the networks 104, 106, 108. It should be noted that databases, servers, and/or additional components may be utilized with, or integrated into, any type of network element coupled to the networks 104, 106, 108. In the context of the present description, a network element may refer to any component of a network.

Figure 2A:
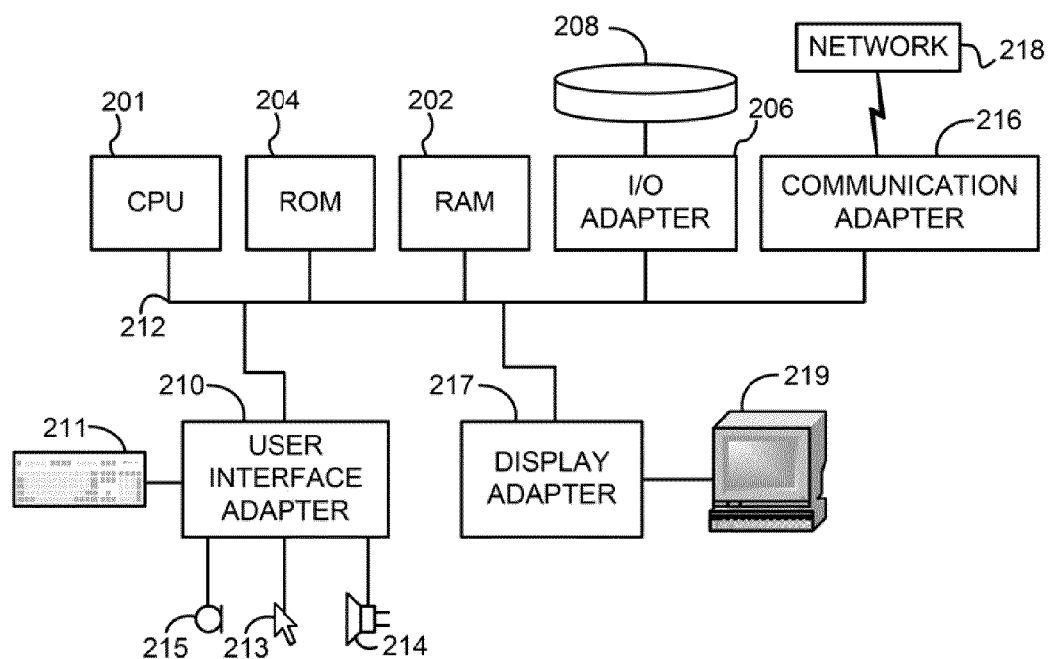
FIG. 2A shows a representative hardware environment that may be associated with the servers and/or clients of FIG. 1, in accordance with one embodiment.

The workstation shown in FIG. 2A includes a central processing unit (CPU) 201 for performing computations, Random Access Memory (RAM) 202, Read Only Memory (ROM) 204, an I/O adapter 206 for connecting peripheral devices such as magnetic storage units 208, such as a hard disk drive (HDD), to the bus 212, a user interface adapter 210 for connecting a keyboard 211, a mouse 213, a speaker 214, a microphone 215, and/or other user interface devices such as a touch screen, a digital camera (not shown), etc., to the bus 212, communication adapter 216 for connecting the workstation to a communication network 218 (e.g., a data processing network) and a display adapter 217 for connecting the bus 212 to a display device 219.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

Figure 2B:
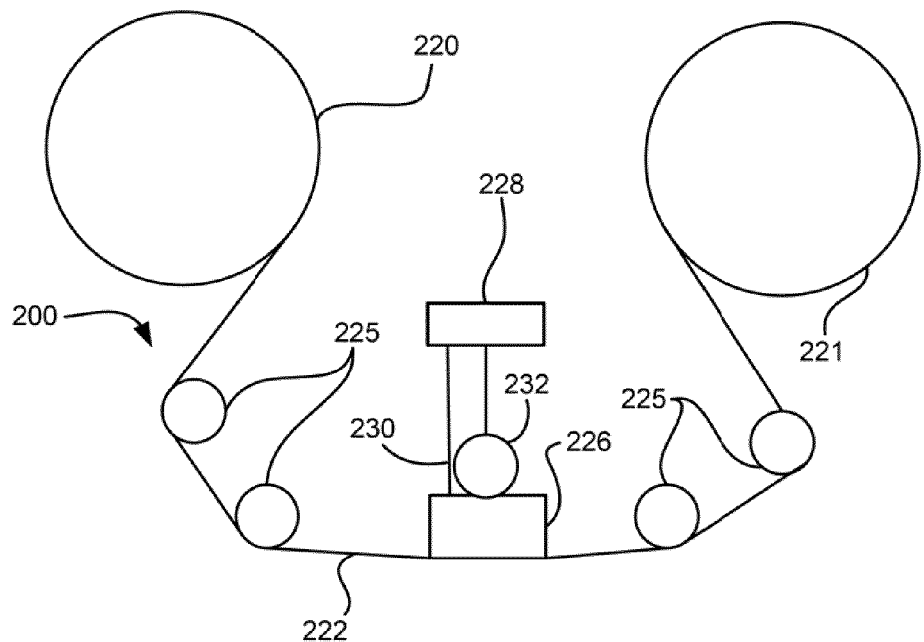
FIG. 2B is a schematic of tape drive system, in accordance with one embodiment.

FIG. 2B is a schematic diagram of a simplified tape drive system, in accordance with one embodiment, which may be a standalone unit, part of a tape library system, a peripheral 120 of FIG. 1, a magnetic storage unit 208 of FIG. 2A, etc. Such a tape drive may be employed in the context of an embodiment of the present invention. While one specific implementation of a tape drive is shown in FIG. 2B, it should be noted that the embodiments of the previous figures may be implemented in the context of any type of tape drive system.

As shown, a tape supply cartridge 220 and a take-up reel 221 are provided to support a tape 222. These may form part of a removable cassette and are not necessarily part of the system. Guides 225 guide the tape 222 across a preferably bidirectional tape head 226. Such tape head 226 may be a MR, GMR, TMR, spin-valve, or other type. Tape head 226 is in turn coupled to a controller assembly 228 via a connector cable 230. The controller 228, in turn, controls head functions such as servo following, write bursts, read functions, etc. An actuator 232 controls position of the head 226 relative to the tape 222.

A tape drive, such as that illustrated in FIG. 2B, includes drive motor(s) to drive the tape supply cartridge 220 and the take-up reel 221 to move the tape 222 linearly over the head 226. The tape drive also includes a read/write channel to transmit data to the head 226 to be recorded on the tape 222 and to receive data read by the head 226 from the tape 222. An interface is also provided for communication between the tape drive and a host (integral or external) to send and receive the data and for controlling the operation of the tape drive and communicating the status of the tape drive to the host, all as will be understood by those of skill in the art.

A computer implemented tool (system, method or computer program product) for identifying problems in remote system data according to one embodiment may include logic for receiving a data set representative of data of a remote system. As noted above, the data set may be a print of the data, or any other data set representative of the data. The data may be VTOC/INDEX data or any data on or associated with the remote system. The system also includes logic for replicating the data of the remote system using the data set, and logic for writing the replicated data to a simulation volume, the simulation volume having the same configuration as the volume of the remote system that has the data from the remote system. A problem identification module recreates an error scenario and identifies an error in the replicated data. Additional information, such as dumps, traces, or actual system data from the remote system are not be needed or used in one approach.

In one example, assume a remote system has 100 TB of data and encounters errors. A printout of the VTOC/INDEX of the remote system data is generated, and is about 100 MB. This size depends on how fragmented the volume is and how much data is allocated on the volume to which it pertains. The print is received at the debugging site, where the VTOC/INDEX is recreated from the print and stored in a simulation VTOC and Index. For example, to write a simulation INDEX from a print 'A.IX' to device 0F40, a code such as the following is used as parameters of the tool:
PARM='-INDEX "A.IX"-DEVN 0F40'
To write a simulation VTOC from the print 'A.VT' to device 0F40, a code such as the following is used:
    PARM='-VTOC "D55TST.P69645.VT"-DEVN 0F40'
Once the tool runs successfully to create the simulation VTOC and INDEX on device 0F40, the debugging team is ready to run the recreate the scenario that the owner of the remote system described.

Figure 3:
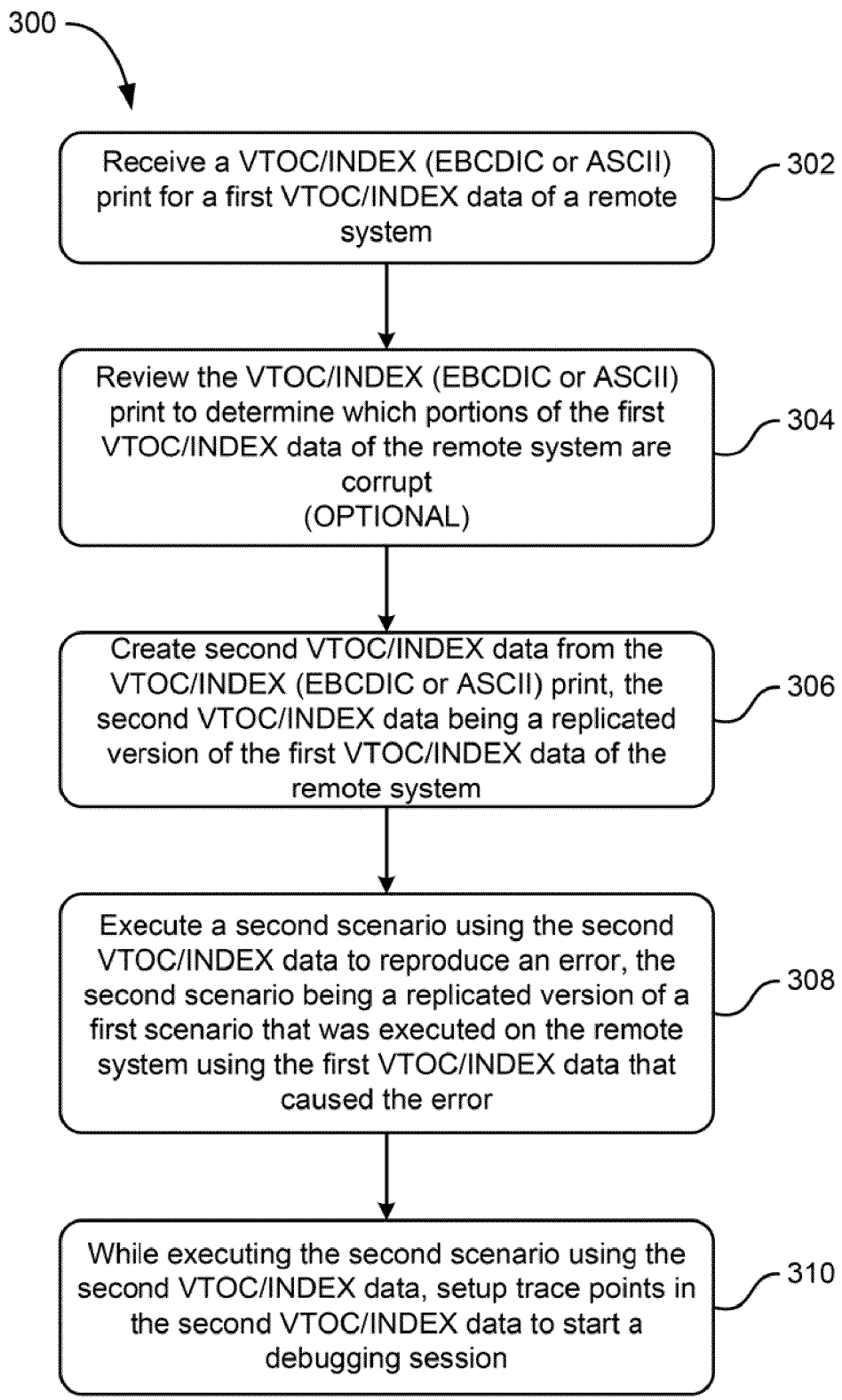
FIG. 3 shows a flow chart of a method according to one embodiment.

Referring to FIG. 3, according to one embodiment, a method 300 for analyzing information from a remote system is described. In some embodiments, the information from the remote system may include a corrupted VTOC and/or INDEX. The method 300 may be performed in any desired environment, remotely, locally, etc. It may be performed by a computer system, processor, etc. and may be implemented in software, hardware, etc.

In operation 302, a VTOC/INDEX EBCDIC(ASCII) print of a first VTOC/INDEX data of a remote system is received. The VTOC/INDEX EBCDIC(ASCII) print may be received by any method, such as through a network connection (such as that shown in FIG. 1), from a physical storage medium (such as a CD-ROM, DVD-ROM, flash drive, etc.), by requesting the print from the remote system, etc.

In optional operation 304, the VTOC/INDEX EBCDIC (ASCII) print of VTOC/INDEX data of the remote system is reviewed to determine which portions of the first VTOC/INDEX data of the remote system are corrupt. This preferably is executed automatically by a processor after the VTOC/INDEX EBCDIC(ASCII) print is received, but is not so limited. The reviewing may mark portions that are corrupt, may indicate in a separate list or table which portions are corrupt, may form a separate file which has at least the corrupt portions, etc. With the VTOC/INDEX EBCDIC(ASCII) print, it can be verified that the first VTOC/INDEX data was actually corrupted. However, it cannot tell when, why, or how the VTOC/INDEX data was corrupted. That is why a scenario is run using a copy of the first data.

In operation 306, second VTOC/INDEX data is created from the VTOC/INDEX EBCDIC (ASCII) print, which is a replicated version of the first VTOC/INDEX data of the remote system. In this way, the first VTOC/INDEX data does not need to be sent to a local system to be processed. Instead, replicated data can be created on a simulation volume (local volume) for testing purposes, according to one embodiment, in which case the simulation volume will have the exact configuration that the remote system has.

In some approaches, the second VTOC/INDEX data may be stored to a local volume for manipulation and/or processing thereof at a later time.

In operation 308, a second scenario is executed using the second VTOC/INDEX data to reproduce an error. The second scenario is a replicated version of a first scenario that was executed using the first VTOC/INDEX data on the remote system that caused the error. In preferred embodiments, the second scenario is run in a fully-equipped debugging environment. This may be a simple task, such as running a command-line or a batch job that resulted in corrupted VTOC/INDEX data, and thus an error.

According to some approaches, the second scenario may be created at least partially based on input from a user who experienced the error on the remote system. This user may produce a problem statement which details the error experienced, what was performed in order to reach the error, and any other significant information that may aid in recreating the first scenario.

In operation 310, while executing the second scenario using the second VTOC/INDEX data, trace points are setup in the second VTOC/INDEX data to start a debugging session. The debugging session may be run as many times as desired in order to fully determine a cause of the error, and thereby rectify the VTOC/INDEX data to no longer produce the error while executing the scenario. While running the second scenario, which is a replicated version of a first scenario that failed, necessary trace points may be setup in a code that produces the data, in order to start the debugging session. In a fully-equipped environment, it is easier to analyze the data on the fly without having to make repeated requests for additional data from the remote system to gather a large amount of analysis data. The data may be examined as the tracing occurs to determine what caused the error in the first (or second) VTOC/INDEX data.

In some approaches, the method 300 may further include creating a test case based on the second scenario and adding the test case to a regression test bucket. In this way, already-performed scenarios can be quickly analyzed in future cases to determine if they possibly are causing an error.

In one embodiment, the method 300 is executed with the proviso that no further information is received from the remote system. In this way, the method 300 is capable of recreating remote data and an error-causing scenario by only receiving the VTOC/INDEX data from the remote system.

In some embodiments, the tracing is repeated again if it is desired to restart the debugging session to look for further analysis about the error and determine what caused it.

In one embodiment, the method 300 is executed with the proviso that a dump and trace from the remote system is not received. In this way, the time consuming process of creating and transferring a dump and trace from a remote system can be avoided.

Of course, the methods and systems described herein may be embodied in a computer program product for execution on a processor. In some embodiments, the print received may adhere to one or more formats, including Extended Binary Coded Decimal Interchange Code (EBCDIC), American Standard Code for Information Interchange (ASCII), and the like, for consistent processing thereof by the computer program product.

While various embodiments have been described above, it should be understood that they have been presented by way of example only; and not limitation. Thus, the breadth and scope of a preferred embodiment should not be limited by any of the above-described exemplary embodiments, but should be defined only in accordance with the following claims and their equivalents.

What is claimed is:

1. A computer implemented system for identifying problems in remote system data, the system comprising:
    hardware for receiving a data set representative of data of a remote system, wherein the data is volume table of contents (VTOC)/INDEX data;
    logic for replicating the data of the remote system using the data set;
    logic for writing the replicated data to a simulation volume, the simulation volume having a same configuration as a volume of the remote system having the data; and
    a problem identification module for recreating an error scenario and identifying an error in the replicated data.

2. The system as recited in claim 1, wherein actual system data from the remote system is not used by the problem identification module.

3. The system as recited in claim 1, with the proviso that a dump and trace of the remote system is not used by the problem identification module.

4. The system as recited in claim 1, wherein the error scenario is saved as a new test case.

5. A debugging tool, comprising:
    a processor; and
    logic, that when executed by the processor, causes the processor to:
        receive a Volume Table of Contents (VTOC)/INDEX data set for a first VTOC/INDEX data of a remote system;
        create second VTOC/INDEX data from the VTOC/INDEX data set, the second VTOC/INDEX data being a replicated version of the first VTOC/INDEX data of the remote system;
        execute a second scenario using the second VTOC/INDEX data to reproduce an error, the second scenario being a replicated version of a first scenario that was executed on the remote system using the first VTOC/INDEX data that caused the error; and
        set up trace points in the second VTOC/INDEX data to start a debugging session while executing the second scenario using the second VTOC/INDEX data.

6. The tool as recited in claim 5, with the proviso that a dump and trace of the remote system is not received during the debugging session.

7. The tool as recited in claim 5, further comprising logic, that when executed by the processor, causes the processor to create a test case based on the second scenario and add the test case to a regression test bucket.

8. The tool as recited in claim 5, further comprising logic, that when executed by the processor, causes the processor to create the second scenario at least partially based on input from a user who experienced the error on the remote system.

9. The tool as recited in claim 5, further comprising logic, that when executed by the processor, causes the processor to examine the VTOC/INDEX data set to determine which portions of the first VTOC/INDEX data of the remote system are corrupt.

10. A method, comprising:
    receiving a Volume Table of Contents (VTOC)/INDEX Extended Binary Coded Decimal Interchange Code (EBCDIC) or American Standard Code for Information Interchange (ASCII) data set for a first VTOC/INDEX data of a remote system;
    creating second VTOC/INDEX data from the VTOC/INDEX (EBCDIC or ASCII) data set, the second VTOC/INDEX data being a replicated version of the first VTOC/INDEX data of the remote system;
    using a processor to execute a second scenario using the second VTOC/INDEX data to reproduce an error, the second scenario being a replicated version of a first scenario that was executed on the remote system using the first VTOC/INDEX data that caused the error; and
    setting up trace points in the second VTOC/INDEX data during a debugging session while executing the second scenario using the second VTOC/INDEX data.

11. The method as recited in claim 10, further comprising creating a test case based on the second scenario and adding the test case to a regression test bucket.

12. The method as recited in claim 10, further comprising creating the second scenario at least partially based on input from a user who experienced the error on the remote system.

13. The method as recited in claim 10, further comprising reviewing the VTOC/INDEX (EBCDIC or ASCII) data set to determine which portions of the first VTOC/INDEX data of the remote system are corrupt.

14. The method as recited in claim 10, with the proviso that no further data is received from the remote system during the debugging session.

15. A computer program product, comprising:
    a non-transitory computer readable storage medium having computer readable program code embodied therewith, the computer readable program code comprising:
        computer readable program code configured to receive a Volume Table of Contents (VTOC)/INDEX data set for a first VTOC/INDEX data of a remote system;
        computer readable program code configured to create second VTOC/INDEX data from the VTOC/INDEX data set, the second VTOC/INDEX data being a replicated version of the first VTOC/INDEX data of the remote system;
        computer readable program code configured to execute a second scenario using the second VTOC/INDEX data to reproduce an error, the second scenario being a replicated version of a first scenario that was executed on the remote system using the first VTOC/INDEX data that caused the error; and
        computer readable program code configured to set up trace points in the second VTOC/INDEX data to start a debugging session while executing the second scenario using the second VTOC/INDEX data.

16. The computer program product as recited in claim 15, with the proviso that no further data, including a dump and trace of the remote system, is received during the debugging session.

17. The computer program product as recited in claim 15, further comprising computer readable program code configured to create a test case based on the second scenario and add the test case to a regression test bucket.

18. The computer program product as recited in claim 15, further comprising computer readable program code configured to create the second scenario at least partially based on input from a user who experienced the error on the remote system.

19. The computer program product as recited in claim 15, further comprising computer readable program code configured to review the VTOC/INDEX data set to determine which portions of the first VTOC/INDEX data of the remote system are corrupt.

* * * * *